United States Patent

Masar

[15] 3,702,071

[45] Nov. 7, 1972

[54] GAUGE CONTROL METHOD AND APPARATUS FOR METAL ROLLING MILLS

[72] Inventor: Edward J. Masar, Irwin, Pa.

[73] Assignee: Westinghouse Electric Corporation, Pittsburgh, Pa.

[22] Filed: Oct. 14, 1970

[21] Appl. No.: 80,683

[52] U.S. Cl............................................72/8, 72/19
[51] Int. Cl. ...............................................B21b 37/08
[58] Field of Search..........................72/6–12, 16, 19, 72/21

[56] References Cited

UNITED STATES PATENTS

| | | | |
|---|---|---|---|
| 3,448,600 | 6/1969 | Coleman et al.....................72/8 |
| 3,357,217 | 12/1967 | Wallace et al.....................72/8 |
| 2,883,895 | 4/1959 | Vossberg...........................72/9 |

*Primary Examiner*—Milton S. Mehr
*Attorney*—F. H. Henson and R. G. Brodahl

[57] ABSTRACT

A programmed digital computer control system provides an on-line roll force gauge control for a multiple stand tandem hot metal strip rolling mill, A gauge control program calculates the workpiece strip delivery gauge or thickness related force error from at least one stand of the rolling mill and compares this calculated delivery gauge related force error with a desired or reference delivery gauge related limit force error for the same stand to establish a delivery gauge error related force error. The gauge control program then determines in relation to the magnitude of this force error representation of the delivery gauge error for the same one stand that this force error is to be corrected by adjustment of the operation of that same one stand or is to be fed forward in the direction of the workpiece strip movement to determine the correction in a succeeding stand of the rolling mill by adjustment of the operation of the succeeding stand. This force error is effective to adjust the latter stand operation for a time interval related to the movement of the workpiece or workpiece strip portion where this force error is measured between those respective stands of the rolling mill.

14 Claims, 8 Drawing Figures

GAUGE CONTROL METHOD AND APPARATUS FOR METAL ROLLING MILLS

CROSS REFERENCE TO RELATED APPLICATIONS

Reference is made to the following copending patent applications: (1) U.S. Pat. No. 3,561,237, and entitled "Predictive Roll Force Gauge Control Method and Apparatus for Metal Rolling Mills" by C.W. Eggers and J. Csonka, and (2) Ser. No. 80,682 filed Oct. 14, 1970 and entitled "Gauge Control Method and Apparatus For Metal Rolling Mills" by A.W. Smith.

BACKGROUND OF THE INVENTION

The present invention relates to metal rolling mills and more particularly to roll force gauge control systems and methods used in operating such mills.

In the operation of a metal or steel reversing or tandem rolling mill, the unloaded roll opening and the speed at each tandem mill stand or for each reversing mill pass are set up by the operator or by a programmed digital computer control system to produce successive workpiece reductions resulting in delivered work product at the desired gauge. Generally the loaded roll opening at a given roll stand equals the stand delivery gauge or thickness on the basis of the assumption that there is little or no elastic workpiece recovery.

Since the setup conditions can be in error and since certain mill parameters affect the stand loaded roll opening during actual rolling operation and after setup conditions have been established, a stand gauge control system is usually employed to closely control the stand delivery gauge. At the present state of the rolling mill art, and particularly the steel rolling mill art, a stand gauge control system is normally used for a reversing mill stand and for predetermined stands in tandem rolling mills.

The well known gaugemeter or roll force gauge control system has been widely used to produce stand gauge control in metal rolling mills and particularly in tandem hot steel strip rolling mills and reversing plate mills where experience has demonstrated that roll force control is particularly effective. This system uses the roll force signal from individual stand load cells as an indication of gauge variation, and signals the stand screw down to correct for the delivery gauge error from each roll force controlled stand. The roll force signal does not provide a measure of the actual delivery gauge from a given stand but only indicates the change in gauge from an initial value. Therefore, a workpiece thickness measurement gauge such as the well known X-ray gauge is generally used to maintain calibration of the roll force system, and this is done through a monitoring system with the X-ray gauge positioned subsequent to the last stand of the tandem rolling mill and providing a periodic check to correct the roll force system calibration.

The automatic gauge control system on each roll stand is energized as the work strip enters the roll bite. It is necessary to establish a roll force reference value to control the delivery strip thickness from the stand. This reference value can be set by locking on the head end value of the work strip gauge or can be set by a digital control computer system. The roll force system on a given stand will then operate to maintain the workpiece delivery gauge or thickness obtained with that roll force value unless modified by the X-ray gauge monitor system.

The workpiece delivery gauge from a given stand is maintained by adjusting the roll opening of that stand as a function of the stand roll force and the established mill spring according to the well known roll force relationship $\Delta H = (\Delta F/K) + \Delta SD$, where the workpiece delivery gauge variation $\Delta H$ is regulated to zero. The quantity $K$ is a predetermined mill spring characteristic for the stand which can be approximately calculated in advance, but tests should be conducted after the load cells are installed to determine the respective stand values for various mill operating conditions. The quantity $\Delta F$ is a change in roll force as measured by the stand load cell and subtracted from the initial reference value. The change in screw down position $\Delta SD$ is obtained by a stand screw down position sensing device which provides a signal proportional to screw movement.

It was known in the prior art to provide a slave roll force gauge control system, wherein the screws on a given rolling mill stand move in response to the roll force change of a previous mill stand rather than by the roll force change on the same mill stand. The screw down can follow the roll force error and/or a signal representing screw movement on the previous roll stand. The main difference in these two signals is a small time delay introduced where screw position is followed. If the slave operation stand is a slower speed stand such as stand number 3 this extra time delay may be necessary to obtain proper timing of the slave correction.

It was also known in the prior art to provide a strip in stand logic signal to properly sequence an automatic gauge control system. This is provided by a strip in stand logic signal, which must be extremely reliable and must be able to determine exactly when the tail end of a given work strip coil leaves the stand and when a head end of the next work strip coil enters the same stand. Several approaches have been used to detect the head and tail ends of successive work strips. One of the earliest but least reliable techniques was to detect the stand drive motor armature current which was difficult due to the transient nature of a current signal, noise and the fact that it may temporarily reverse. Also the unloaded current under some conditions may be larger than the loaded current under other conditions especially on the last stand of the rolling mill. A second prior art method was to detect steady state roll force which is reliable except on those stands that are below face without work product being present between the rolls of the stand. This is probably a suitable signal for the first three stands of the six or seven stand mill; where the rolls of the given stand are below face the roll force without product on some schedules will exceed the roll force with product on other schedules. Rate of change of roll force has been used effectively where the rolls are set below face but not with complete reliability. Some workpiece head ends if not cropped properly do not give a sharp change in roll force, and sometimes a similar problem is presented by the tail end. A combination of steady state roll force and rate of change has been used but the logic becomes complex. The most reliable indicating system using roll force appears to be using the lock on principle similar to the roll force lock on used in the automatic gauge control system. The strip in stand indicating system zeroes on the no strip roll force and then voltage detectors detect the change in the roll force when the work strip enters the roll stand. In addition hot metal detectors can be used in combination with the roll force detection system or as a backup system on those roll stands which roll below face.

A more detailed description of roll force automatic gauge control systems can be found in an article published in the Iron and Steel Engineer for December 1967 at pages 75 through 86 and entitled "Automatic Gauge Control For Modern Hot Strip Mills" by J.W. Wallace. A more detailed description of computer programming techniques in relation to the control of metal rolling mills can be found in an article which appeared in the Iron and Steel Engineer Yearbook for 1966 at pages 328 through 334 entitled "Computer Program Organization for an Automatically Controlled Rolling Mill" by John S. Deliyannides and A. H. Green and in another article which appeared in the Westinghouse Engineer for January 1965 at pages 13 through 19 and entitled "Programming for Process Control" by P.E. Lego.

The U.S. Pat. No. 3,357,217 of J.W. Wallace discloses the utilization of one or more succeeding stands after a gauge error measurement stand, with those succeeding stands being operative as slave stands to provide gauge error correction for detected but uncorrected off gauge work strip leaving the previous measurement stand. This practice was known to be desirable for rapid changes in gauge error such as resulted from localized thermal condition differences along the length of the workpiece due to furnace skid marks. Gain tuning of the master or measurement stand N is provided at some conservative value such as 80 percent for reasons of stability, and then a slave stand error correction signal is transmitted to a subsequent correction stand N+1 in a proportion of 20 or 30 percent of the error signal relative to the master stand N gauge error signal. In this way the work strip gauge error not corrected at the master stand N is substantially corrected at the following slave stand N+1. This was a continuously operative analog roll force gauge control system responsive to the gauge error signal detected at master stand N.

The roll force gauge control slave system disclosed in U.S. Pat. No. 3,357,217 did not include a roll force feedback gauge control system on the correction stand N+1, so the only gauge error signal applied to this correction stand N+1 was the feed forward gauge error signal from the previous measurement stand N. There is a problem of gauge error grow back for a succeeding stand error correction without its own gauge control loop, and if an overcorrection in the prior stand N is attempted an unstable condition can arise where the stand N correction might run away. The gauge error at stand N was continuously applied for adjusting the roll opening of stand N and adjusting the roll opening of the following slave stand N+1.

In the operation of a tandem hot strip rolling mill having a plurality of roll stands, a typical work strip will enter the first stand having a thickness of about one inch and be successively reduced in passing through the plural roll stands to a final delivery thickness of about 0.1 inch. The entry speed into the first stand is typically in the order of 200 feet per minute, and the delivery speed leaving the last stand can be in the order of 2,000 feet per minute. Relative to the first roll stand there is no previous measurement roll stand for which the gauge error can be sensed and a corresponding gauge error correction signal developed. Relative to the last stand the delivery speed of 2,000 feet per minute is generally too fast to provide a reasonable transport time from the next previous roll stand for making the desired gauge error correction. A typical transport time interval for a given work strip increment to travel about 18 feet from the second roll stand to the third roll stand is in the order of 2 seconds. With each of the respective stands being spaced about 18 feet from the next adjacent roll stand, it should be readily apparent that the transport time interval of a given work strip increment between adjacent stands is greatest between the first and second roll stands and then progressively decreases in time interval between each successive pair of adjacent roll stands.

SUMMARY OF THE PRESENT INVENTION

The present invention provides a gauge error determined correction signal in accordance with a sensed gauge error representation at a selected measurement stand N and feeds the whole of that sensed representation in the form of a force error signal forward in the direction of workpiece strip travel to a succeeding stand, such as the next adjacent stand N+1, and applies the whole of that force error correction signal for a predetermined time duration to adjust the operation of that succeeding stand N+1 for correcting the gauge error represented by the force error determined at the previous measurement stand N. This predetermined time duration is established in relation to the transport time required for a given portion of the work strip to travel from the next previous stand to the correction stand. For example, if the force error is sensed at measurement stand N, the transport time is the time interval required for a given portion of the work strip to travel from that measurement stand N to the next succeeding correction stand N+1. After this predetermined time duration or time interval the force error determined gauge error correction signal for measurement stand N no longer is effective to control the operation of the succeeding correction stand N+1. The force error at stand N is now sensed again, and if it is greater than a provided limiting reference value the whole of the now sensed force error at stand N relative to a given portion of the work strip is fed forward to the next succeeding stand N+1, for the time interval required for the latter given portion of the work strip to arrive at that succeeding stand N+1, and after which time interval this force error signal from stand N is then removed from the control of the succeeding stand N+1. It should be understood that any remaining gauge error in the workpiece portions then causes the gauge control system at stand N+1 to respond for a correction of such gauge error.

The present control system is operative to sense force error at the roll bite at a measurement roll stand N. For a typical hot strip mill there are no intermediate X-ray gauges between the early roll stands to sense the actual delivery gauge of the work strip leaving one of these early roll stands. Thusly, the previous stand N is in effect used as a delivery gauge measurement device and the measured work strip gauge error, as represented by a determined force error, when greater than a predetermined limit value, is passed forward to control the operation of a succeeding correction stand N+1. When the force error for stand N cannot be corrected by a suitable adjustment of stand N for reasons of the size of the correction needed and the necessary time required to correct such a large error by stand N, this force error is fed forward in anticipation of the work strip portion containing the sensed force error arriving at the next successive roll stand.

It should be understood that the force error at stand N is applied in full to correct the operation of stand N in the conventional roll force automatic gauge control approach relative to stand N, as disclosed in the copending Eggers et al. application. In addition, the full or part of the force error as modified by the multiplier is also applied to the following slave stand N+1 for a selected time interval. The correction signal corresponding to the work strip force error at stand N is passed through effective dead band limits, such that a predetermined minimum force error must occur before an error correction signal is applied to the following stand N+1. If the force error is less than a first limit value corresponding to the dead band limit value, no correction signal is applied to the following stand. If the force error at stand N is greater than this first limit value but less than a second limit value, the total error correction signal is applied in relation to a first gain factor of multiplier to the following stand N+1. If the force error at stand N is greater than the second limit value, the total error correction signal is applied to the following stand N+1 in relation to a second gain factor or multiplier. The total error correction signal is applied to the following stand N+1 for a time interval corresponding to the travel time for a given work strip portion, in which the force error has been detected, to travel from the measurement stand N to the following correction stand N+1. If any remaining force error is sensed by the measurement stand N after the end of this predetermined time interval, this remaining force error is similarly applied as a corresponding correction signal to the following correction stand N+1 for a time interval in accordance with the workpiece portion travel time between these stands. This error correction operation continues to be repeated whenever a force error is determined for the measurement stand.

For each roll stand there is provided a feedback roll force gauge control system. For example, stand N has its own roll force feedback gauge control loop, and the following stand N+1 has its own roll force feedback gauge control loop. The force error at stand N is fed forward to stand N+1, if the force error is greater than the minimum error limit. Thusly stand N+1 has its own feedback force error signal, as well as the feed forward force error signal from previous measurement stand N. Both of these error signals are additively applied to correct gauge error at the correction stand N+1.

The measurement stand N has an inherent response time characteristic which prevents an instantaneous correction at measurement stand N for the force error at stand N. For this reason the error, when greater than a provided limit value, is fed forward to the following correction stand N+1 to allow the latter stand N+1 to in effect have a longer available time to respond to the error at previous stand N, coincidentally with the arrival at stand N+1 of the work strip portion containing the force error sensed at measurement stand N.

The present control system locks in on the sensed value of the force error for a time interval determined by the decrementing of a signal counter provided within the control system and in relation to the physical travel of the error containing work strip portion from the measurement stand N to the correction stand N+1. The present control system then again locks in on the next force error at measurement stand N, after the signal counter has reached a zero count level for the previous time interval operation, and the same force error correction operation is repeated successively as necessary in accordance with the sensing of a force error at measurement stand N greater than the provided system operational dead band signal limits.

Thusly, the present control system senses gauge error representation force error at measurement stand N or by a prior gauge error determining device and holds onto this sensed value of gauge error representation for a predetermined time interval for adjusting the operation of the succeeding correction stand N+1. Then another sensing of the gauge error representation is taken and held for a succeeding transport time interval to adjust the operation of correction stand N+1. In this manner a compromise is provided between the response time of the following correction stand N+1 to approximately match the work strip portion travel time from gauge error determination to the following stand N+1. If the anticipatory effect of the present control system actually begins the error correction of slave stand N+1 too early, and at a time before the gauge error containing work strip increment actually reaches the succeeding stand N+1 such that a small gauge error is thereby introduced, this is more desirable than letting a skid mark caused gauge disturbance pass through the present gauge control system uncorrected. Also by adjusting the dead band minimum error limit from a first value such as 10 mils of gauge error (for an early stand of the rolling mill) for example, to a larger minimum error limit such as 15 mils, this can provide some control over the introduction of the latter undesired anticipation gauge error; in effect this results in a greater minimum movement of the correction stand N+1 roll opening adjustment mechanism such that more time is needed to make this larger adjustment movement. Another way to establish these error dead band limits would be as some percentage of the force error represented gauge error at stand N. A given error limit such as 10 mils could be permitted for an early stand such as the second stand, but it should not be used for controlling the last stand of the tandem rolling mill because 10 mils is the total movement of the screws for that last stand. The maximum movement that can be made in mils of adjustment for each stand is well known by persons skilled in this art, and some limit such as 10 percent of this permitted maximum movement could be employed as a dead band limit relative to the uncorrected gauge error at a previous measurement stand. The first stand could be controlled by an entry thickness sensing device if desired, but such a gauge device is usually not employed for operation with a hot strip rolling mill. The roll force gauge control response speed depends principally on the gain of the roll force gauge control system, that is, the rate of control screwdown movement per unit of detected roll force error. Since the stand delivery gauge is determined by the intersection point of the mill spring curve (roll force versus roll opening) and the workpiece deformation curve (yield force versus thickness reduction), the total amount of the screwdown movement required to correct a roll force error or other detected gauge error representation depends primarily on the mill spring constant and the workpiece plasticity. The workpiece plasticity and the mill elasticity thus affect the rate at which corrective control actions should be applied, which is the system gain.

DESCRIPTION OF THE PREFERRED EMBODIMENT

Figure 1:
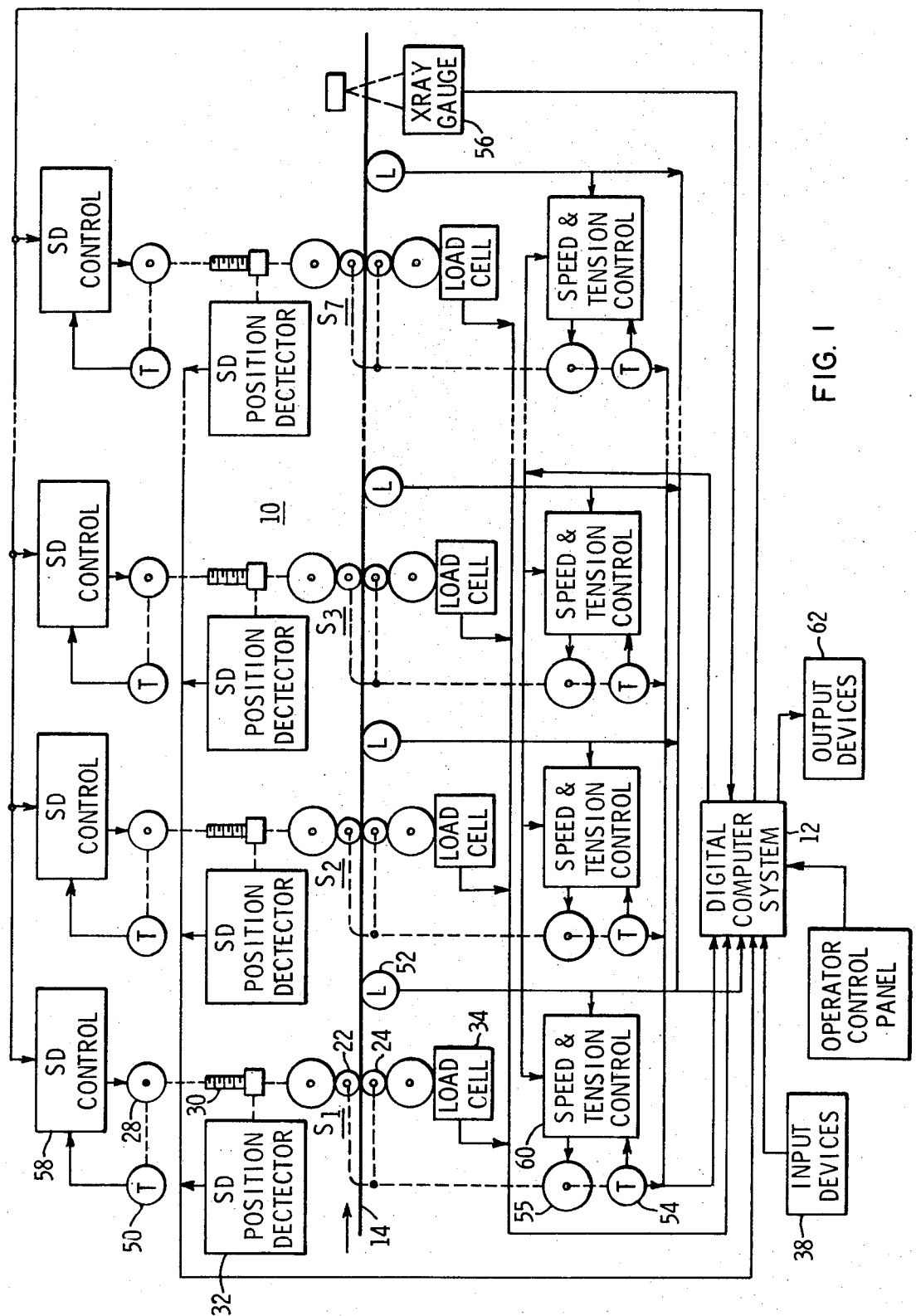
FIG. 1 shows a schematic diagram of a tandem hot strip metal rolling mill and a digital computer system operative for gauge control and arranged in accordance with the principles of the present invention.

There is shown in FIG. 1 a tandem hot strip steel finishing mill 10 operative with improved gauge control performance by a digital computer system 12 in accordance with the principles of the present invention. Generally however the invention is applicable to various types of mills in which roll force gauge control is employed. For example, the invention can be suitably adapted for application in hot steel plate reversing and other rolling mills.

The tandem mill 10 includes a series of reduction rolling stands S1 through S7, with three of the stands S1, S2 and S7 shown. A workpiece 14 enters the mill 10 at the entry end in the form of a bar and it is elongated as it is transported through the successive stands S1 through S7 to the delivery end of the mill, where it is coiled as a strip on a down coiler. The entry bar would be of known steel grade, and it typically would have a thickness of about 1 inch and a width within some known limited range such a20 inches to 80 inches. The delivered strip would usually have approximately the same width and a thickness based upon the production order for which it is intended. In the reduction rolling process the successive stands operate at successively higher speeds to maintain proper workpiece flow. Each stand produces a predetermined reduction or draft such that the total mill draft reduces the entry bar to final delivery strip with the desired gauge. Each stand is conventionally provided with a pair of work rolls 22 and 24 between which the workpiece 14 is transported or passed. A large DC drive motor is controllably energized at each stand to drive the corresponding work rolls at a predetermined speed.

As previously described the sum of the unloaded work roll opening and the mill stretch substantially defines the workpiece gauge delivered from any particular stand in accordance with Hooke's law. To vary the unloaded work roll opening at each stand, a pair of screwdown motors 28 with only one being shown in FIG. 1 at each stand position respective screwdowns 30 which clamp against opposite ends of the backup rolls and thereby apply pressure to the work rolls 22 and 24. Normally the two screwdowns 30 at a particular stand would be in identical positions but they can be located at different positions for strip guidance during threading or for other purposes. It should be noted that the provision of an electric motor driving a screwdown mechanism 30 can be replaced by a hydraulic positioning servo system or a hydraulic motor operative with a screwdown mechanism if desired.

A conventional screwdown position detector 32 provides an electrical signal representation of the screwdown or roll opening, and adjustment position at each roll stand, to provide an absolute correspondence between the screwdown position and the unload roll opening between the associated work rolls the screwdown position detection system which includes a screwdown position detector 32 can be calibrated from time to time as desired.

Roll force detection is provided at each of predetermined stands by a conventional load cell 34, and in many cases stands without roll force gauge control would also be equipped with such load cells. The number of stands to which roll force gauge control is applied is predetermined during the mill design in accordance with cost and performance standards, and increasingly there is a tendency at the present time to apply roll force gauge control to all of the stands in a tandem hot strip steel mill. In the illustration in FIG. 1 a roll force gauge control system is employed at each of the seven stands S1 through S7.

The digital computer system 12 can provide automatic control for the operation of the tandem mill 10 as well as desired preceeding production processes not illustrated such as the operation of a roughing mill. Preferably the digital computer system comprises a programmed process control digital computer, which is interfaced with the various mill sensors and the various mill control devices to provide control over many of the various functions involved in operating the tandem mill 10. According to the user preference, the computer system 12 can also include conventional manual and/or automatic analog controls for backup operation in performing preselected mill functions. The digital computer system 12 can include a central integrated process control or set up processor with associated input/output equipment, such as that included in the computer system known as the Prodac 2000 (P–2000) currently sold by the Westinghouse Electric Corporation. The P–2000 processor typically uses an integral magnetic fore 20,000 word (16 bit) memory with nominal 3.0 microsecond cycle time.

The computer processor is associated with predetermined input systems not specifically illustrated, which typically can include a conventional contact closure input system to scan contact or other signals representing the status of various process conditions, a conventional analog input system which scans and converts process analog signals, an operator controlled and other information input devices 38 such as paper tape, teletypewriters and dial input devices. It is noted that the input devices 38 are indicated by a single block in FIG. 1 although different input devices can and typically would be associated with the one or more digital computers in the computer system 12. Various kinds of input information are entered into the digital computer system 12 through the input devices 38 including for example desired strip delivery gauge from the rolling mill and temperature, strip entry gauge and width by entry detectors if desired, grade of steel being rolled, any selected workpiece plasticity tables, hardware oriented programs and control programs for the programming system and so forth.

The contact closure input system and the analog input system interface the digital computer system 12 with the process through the medium of measured or detected variables. The present invention as embodied in a process control system 12 is largely involved in the functioning of the automatic gauge control computer system hereinafter referred to as the AGC computer. In one typical invention application, various mill signals are applied to the AGC computer input system. These mill signals include the following: (1) a roll force signal from the load cell 34 at each stand S1 through S7 proportional to the respective stand roll separating force for use in predictive feed forward roll force gauge control; (2) 14 bit screwdown position signal generated by the respective screwdown position detectors 32 at the stands S1 through S7 for use in predictive feed forward roll force gauge control; (3) position signals from respective loopers 52 for use in looper tension control; (4) stand speed signals generated by respective tachometers 54, with the stand S7 speed signal and/or other stand speed signal being used for calculation of acceleration compensation and for calculation of time delays in the monitor operation; (5) a gauge deviation signal for the X-ray gauge 56 at the delivery end of the mill for programmed monitoring gauge control through the predictive roll force control; (6) an entry temperature signal from a mill entry temperature detector not shown; if references are provided by the set up computer the mill entry temperature for a first workpiece is stored and screwdown compensation is made for subsequent workpieces if the temperature difference of those subsequent workpieces is detected from the stored reference value; (7) workpiece width signals supplied by side guard follow potentiometers for mill spring constant calculations, and so forth.

The measured head end roll force at each stand can be stored and used as a reference for roll force gauge controlled functioning at the respective stands, if the AGC computer is in the lock on mode of roll force operation. On the other hand if the AGC computer is in the absolute mode of roll force operation, the set up computer calculates a predicted head end roll force which is used as an absolute reference for roll force gauge control functioning. Various process data input signals are coupled to the AGC computer through the contact closure input system and can include a strip in stand signal based on the load cell outputs, which initiates the roll force gauge control of the present invention to function. A contact closure output system would be normally associated with each of the computers in the digital computer system 12. In this instance contact closure output systems are respectively associated with the various control devices operated in response to control actions calculated or determined by execution of the control programs in the AGC computer. To effect determined control actions, control devices are operated directly by means of output system contact closure, or by means of analog signals derived from the digital to analog converters. The principal control action outputs from the AGC computer contact closure output system, includes screwdown positioning system commands which are applied to respective screwdown controls 58 in operating the screwdown motors 28 for desired stand screwdown corrective movement, and speed anticipate signals which are applied to various looper tension control systems to cause a change in drive speed to compensate for a change in thickness being made by a screwdown movement. Display and printout systems here illustrated as output devices 62, such as a numerical display tape and teletypewriter systems, are also associated with the outputs of the digital computer system 12 in order to keep the mill operator generally informed about the mill operation and in order to signal the operator regarding an event or alarm condition which may require some action on his part. The printout systems are also used to log mill data according to computer log program direction.

During rolling operation the on line gauge control system operates the stands S1 through S7 to produce strip product having desired gauge and proper shape, that is, flat with slight crown. On line gauge control is provided by the roll force gauge control loops at the stands S1 through S7. To effect on line gauge control in the closed loops, the programmed AGC computer system operates on the screwdown position detector and load cell signals from each stand as well as the X-ray gauge deviation signal to determine the control actions required for producing desired strip delivery gauge at each stand. In effecting control operation the AGC computer employs an AGC programming system which forms a part of the total programming system for the digital computer system 12. The AGC programming system includes programs oriented to controlling the AGC computer system hardware and programming oriented to developing the control actions.

Figure 2:
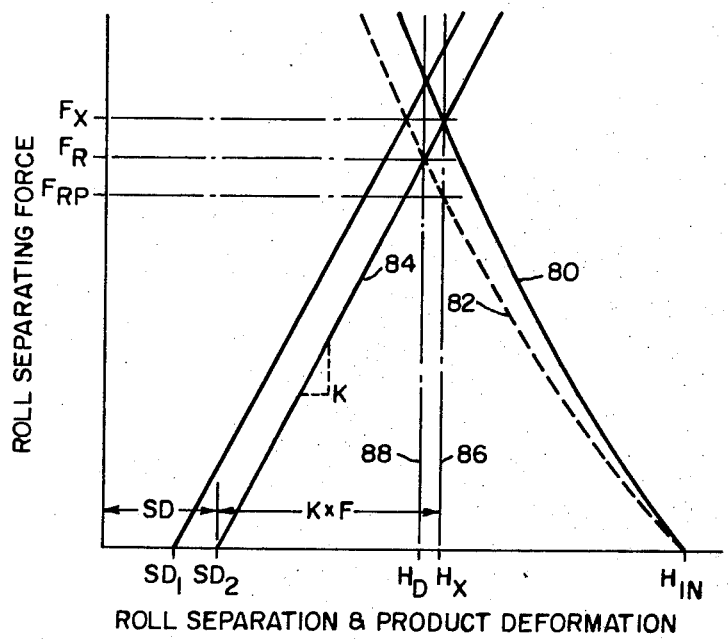
FIG. 2 illustrates a mill spring curve and a workpiece reduction curve, and the manner in which roll force error is determined from these curves.

In FIG. 2 there is shown a plot of roll separating force relative to roll separation and product deformation. The curve 80 represents the workpiece plastic deformation characteristic from the work product being rolled, with the dashed curve 82 representing the predicted workpiece plasticity characteristics and the solid curve 80 representing the actual workpiece plasticity deformation characteristic. It should be noted that roll force increases as delivery thickness decreases. The curve 84 represents the mill spring characteristic of the roll stand, with the slope of the curve 84 being the mill modulus K, in the units of $10^6$ pounds per inch. The screwdown opening SD, in the units of inches, is the roll separation at no load operating conditions. The intersection of the plastic deformation curve 80 and the mill spring curve 84 is the point at which the actual roll force Fx exerted by the mill stand equals the force required to deform the work product, so this intersection is the point that determines the product actual delivery thickness Hx as indicated by the dotted line 86 delivered from the roll stand for a given pass of the workpiece through that roll stand. stand in Precise mill setup is dependent on the calibration of the roll opening adjustment mechanism commonly called the screwdown system, and determines the repeatability of the mill spring modulus K and the predictability of the roll separating force Fx required to make a certain reduction or draft on the particular grade and gauge characteristic work product. The mill screwdown calibration and mill spring modulus are maintained and determined by recalibration each time the rolls are changed, and by on line recalibration at periodic time intervals and employing data collected as the rolling operation proceeds.

Through use of the stored model equations the digital computer system shown in FIG. 1 is operative to predict a roll force FR, in accordance with the predicted product deformation characteristic 82 and in accordance with the stored process model equation and the known mill spring characteristic 84 to provide a desired delivery thickness or gauge HD from the workpiece pass through the roll stand in accordance with the dotted line 88. For the purpose of example, assume that the workpiece product actually passes through the roll stand at the measured roll force FX and provides a delivery thickness from the pass through the roll stand in accordance with the dotted line 86 to indicate an actual delivery gauge HX which is greater than the desired delivery gauge HD. It should be noted that the predicted roll force FR is shown to be lower than the actual measured roll force FX probably because the workpiece is cold. Now if the roll force is repredicted to provide a roll force $F_{RP}$ by using the model equation product deformation characteristic in accordance with the curve 82 and in relation to the actual draft taken, the repredicted roll force $F_{RP}$ is even lower than the original predicted roll force $F_R$ because the higher roll force is caused by a smaller than expected reduction in the gauge of the workpiece strip. If desired a comparison can now be made between the measured roll force $F_X$ and the repredicted roll force $F_{RP}$ to provide an indication of the amount of correction needed in the model equation to provide the desired actual delivery thickness of the workpiece strip leaving the roll stand. This correction ratio of the measured roll force $F_X$ to the repredicted roll force $F_{RP}$ is the value that can be used as a learning procedure to up-date the model equation stored within the memory of the digital computer system 12.

At any particular screwdown position, and with the correct screwdown position system calibration, the workpiece delivery gauge from a given pass through the roll stand equals the unloaded roll opening SD plus the mill stretch caused by the workpiece, which is indicated as the product of the mill spring modulus K times the measured roll force $F_X$. The workpiece plasticity P is the slope of the product deformation curve 80, and in this case the curve 82 is shown as being substantially linear through a small amount of linearity would normally exist.

The desired workpiece delivery gauge $H_D$ from the pass through the roll stand is the initial condition predicted by the model equations in accordance with a predicted or reference roll force $F_R$ required to reduce the thickness of the workpiece from input thickness $H_{IN}$ to desired delivery thickness $H_D$. This roll force is equal to the amount of roll separating force required to stretch the rolls from the unloaded screwdown position SD to a loaded roll opening $H_D$, at the intersection of the mill spring curve 84 at an initial screwdown opening $S_D$ and the predicted product deformation curve 82.

If the actual delivery gauge $H_X$ results from a pass of the workpiece strip through the roll stand, to indicate a gauge error amount GE equal to $H_X$ minus $H_D$, corrective screwdown closing can cause the unload screw opening SD to be reduced to a new value, which when added to the mill stretch is equal to the desired gauge $H_D$.

In order to calculate the predicted amount of screwdown movement required to correct a roll force error, the force error FE at a given roll stand is calculated as follows:

$$FE = FX - FR - K(SD1 - SD2) \quad (1)$$

where FE is the force error, FX is the measured roll force for a given pass of the workpiece strip through the roll stand, FR is the predicted or reference roll force which can either be a lock on value or absolute value as determined by model equations, K is the stand mill spring constant, SD1 is the measured screwdown roll opening and SD2 is the initial lock on or model equation predicted screwdown roll opening.

The gauge error GE is determined as the force error divided by the mill modulus K in the units of millions of pounds per inch and in accordance with the equation $$GE = FE/K \quad (2)$$

Equations (1) and (2) are set forth in greater detail in the above referenced U.S. Pat. No. 3,561,237 by C.W. Eggers and J. Csonka. The screwdown correction needed to correct for the gauge error GE is determined by the relationship:

$$\Delta SD = L(FE) \quad (3)$$

where $L$ is the relationship:

$$L = (P/K^2) + (1/K) \quad (4)$$

The above relationships are also set forth in greater detail in the latter U.S. Pat. No. 3,561,237.

Figure 3:
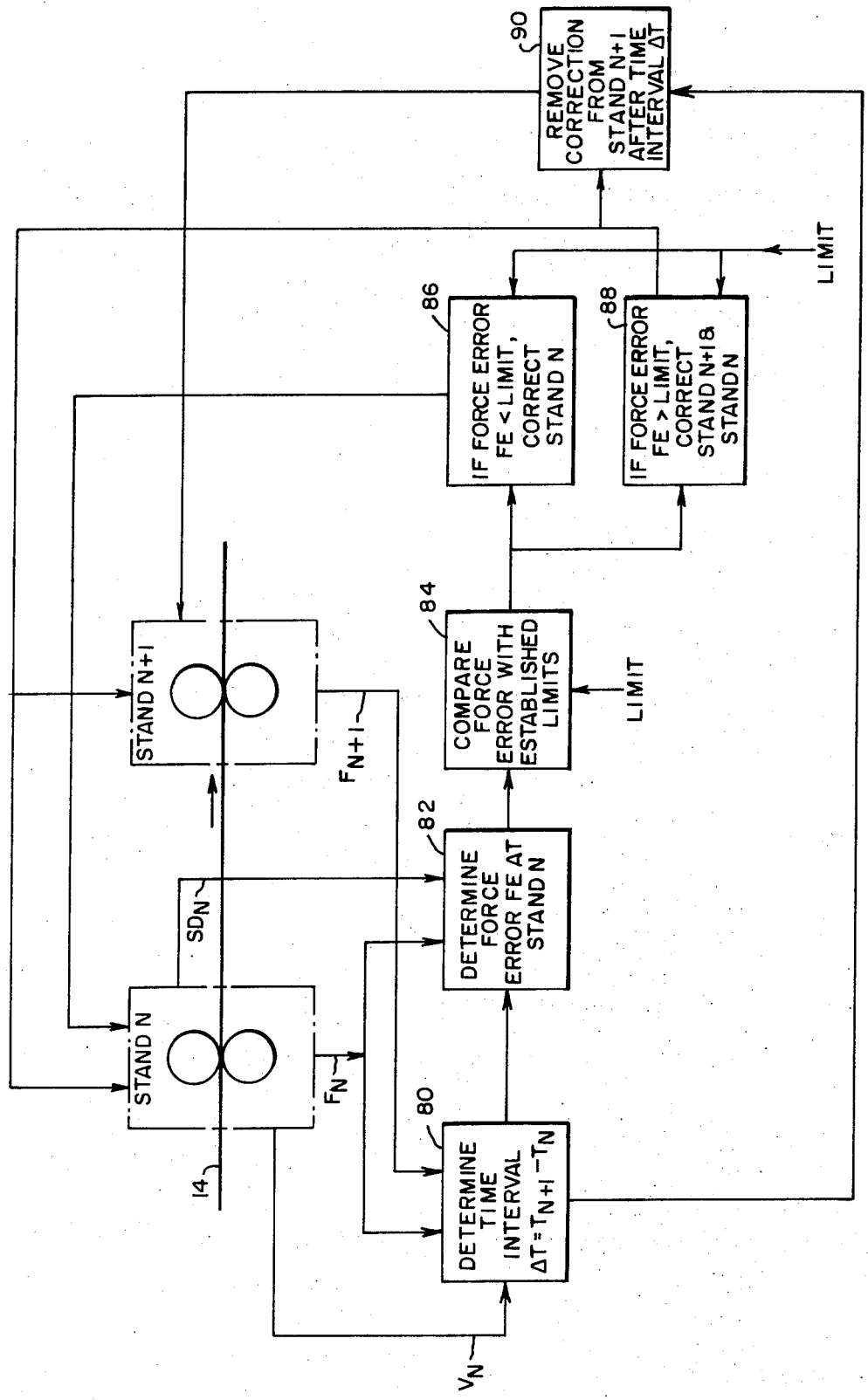
FIG. 3 shows a functional block diagram to illustrate the operation of the present gauge control system.

In FIG. 3, there is shown a functional block diagram to illustrate the operation of the present invention relative to a gauge control method and apparatus for tandem stand metal rolling mills. A gauge error representation measurement stand N is generally indicated, followed by a correction stand N+1, relative to the work strip 14 passing in the indicated direction by the arrow through the roll stands N and N+1. At functional block 80 a determination is made of the transport time interval, through operation of strip in stand logic which per se is well known to persons skilled in this art, for the passage of a given workpiece strip portion containing a gauge error disturbance in the workpiece strip 14 from stand N to stand N+1. In other words there is a determination of the time interval $T_{N+1}$ minus $T_N$, corresponding to the transport time of such a disturbance in stand N and from stand N to stand N+1. At block 82 a determination is made of the stand N roll force error FE in accordance with above equation (1) and in relation to the operation of stand N. At block 84 a comparison is made between the determined force error FE with predetermined and established limits to in effect establish an operational dead band, such that when the force error falls within these established limits no correction is passed onto stand N+1 relative to the force error measured in the delivery work strip from stand N. At block 86 there is established whether the force error FE is less than an established additional and lower limit value; if it is, the force error is applied to correct the operation of stand N. If the determined force error FE is greater than the established limit, at block 88 this limit check is determined and correction in accordance with said force error FE is applied to correct stand N and is also fed forward and applied to correct stand N+1. At block 90 the force error FE determined correction is removed from stand N+1, after the determined time interval which was established in block 100.

For a rolling mill having a different and higher run speed than the thread speed, the functional block 80 can include a sensing of the run velocity or operational run speed $V_R$ of the stand N and use this in relation to the initial rolling stand speed $V_{HE}$ when the head end of the workpiece passed through the rolling stand N to modify the determined transport time delay time interval $\Delta T$, as follows.

$$\Delta T_R = \Delta T_{HE} [V_{HE}/V_R]$$

where $\Delta T_R$ is the time delay between stand N and stand N+1 during run operation of rolling stand N, $\Delta T_{HE}$ is the head end thread speed of stand N, $V_{HE}$ is the stand N speed during head end thread operation and $V_R$ is the run speed of rolling stand N. The above operation is periodically run as may be desired.

Figure 4:
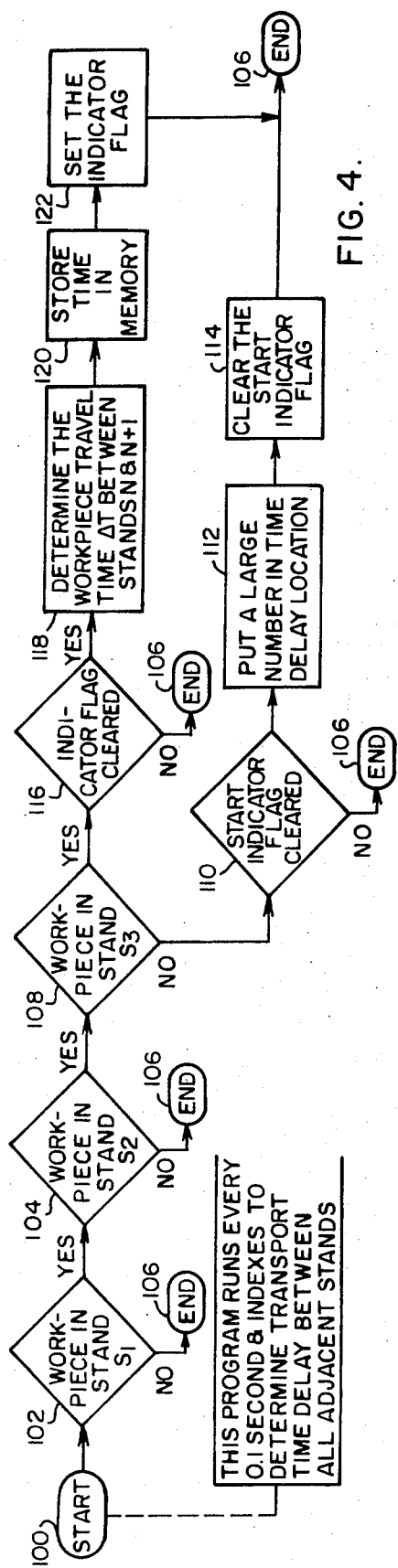
FIG. 4 shows the logic flow chart for an automatic gauge control program subroutine employed in the digital computer system shown in FIG. 1 to determine the transport time between a measurement stand N, which for the purpose of this illustration is stand number 2 and a succeeding correction stand N+1, which for this illustration is stand number 3.

In FIG. 4 there is shown the logic flow chart for a program to establish the work strip transport time interval $\Delta T$ between measurement stand N and correction stand N+1. In the example chosen for FIG. 4, stand N could be stand S2 of the tandem rolling mill and stand N+1 would then be stand S3. This program shown in FIG. 4 runs every one-tenth of a second, and can be triggered by a well known sub-routine within the digital computer system 12, such as the synchronizer interrupt subroutine disclosed in the above referenced article entitled "Computer Program Organization For An Automatically Controlled Rolling Mill" which appeared in the Iron and Steel Engineer Yearbook for 1966. Such a synchronizer interrupt subroutine provides a real time input to the computer from a train of 60 cycle timing pulses, In addition to keeping track of real time this subroutine triggers periodic programs at various levels and triggers periodic scan of contact inputs and outputs and determines expiration of desired time delays.

The program shown in FIG. 4 can be utilized in relation to establish the transport time interval for a given workpiece gauge disturbance sensed in a roll stand, such as stand S2, to pass to the succeeding roll stand, such as stand S3. The accuracy of the program depends upon how soon the work strip gauge disturbance is detected in the measurement stand N, and also upon the operating speed of the time delay counter provided within the digital computer system 12. The program can be utilized for controlling the operation of any correction stand, where a previous measurement stand is operative to establish that a workpiece gauge error of a workpiece portion is passing through the measurement stand. For example, the workpiece gauge error may be sensed as soon as the disturbance enters the measurement stand N, or this gauge error may be sensed one-tenth of a second later. Also the speed of the time interval counter, which is decremented every one-tenth of a second off the provided synchronizer interrupt program determines the accuracy of the establishment of the transport time interval.

The program shown in FIG. 4 starts at step 100 every one-tenth of a second. At step 102 the presence of the workpiece in the first stand S1 of the rolling mill is sensed by the roll force signal provided by the load cell operative with the first stand S1. If the workpiece is sensed to be present in roll stand S1, the program advances to step 104, where a determination is made whether the workpiece is present in the second roll stand S2. At step 102 if the workpiece is not present in roll stand S1, the program advances to step 106, which is the end of this run through the program. At step 104 if the work strip is present at roll stand S2, as indicated by the stand roll force signal and strip in stand logic operation associated with the digital computer system 12, the program advances to step 108 for a determination whether the workpiece is present in the third roll S3 as indicated by the third stand roll force signal. At step 104 if the work strip is not present in roll stand S2, the program advances to step 106 which is the end of this run through the program.

At step 108 if the workpiece is not present in roll stand S3, the program branches to step 110. At step 110 a determination is made if the start programming indicator flag is set, which flag is set manually in the first instance when the illustrated program is used, and then during the time interval determining run through the program as will be later explained. If this flag is set, the program advances to step 112 where an arbitrary large number, suitable for later counting down in preparation of an exclusive or operation, is placed into the time delay counter location. For the example of a 14 bit machine, such a large number would be 17777. The program advances to step 114 where the start indicator flag is cleared, and then the program advances to step 106 which is the end of this run through the program.

After one-tenth of a second as determined by the synchronizer interrupt program, the run through the program shown in FIG. 4 starts again at step 100. Under the assumption the workpiece is sensed to be present at roll stand S1 at step 102, and the workpiece is sensed to be present at roll stand S2 at program step 104, and the workpiece is sensed to be present at roll stand S3 at program step 108, the program now advances to step 116 to determine if the start indicator flag is cleared. The start indicator flag is now cleared, since this indicator flag was cleared at program step 114 by an earlier run through this same program. Thusly, the program now advances to step 118 to determine the workpiece travel time $\Delta T$ between measurement stand S2 and correction stand S3, which correspond to stand N and stand N+1 as previously described.

The synchronizer interrupt sub-routine program was decrementing the time delay counter within the digital computer system 12 for the time period that it took to first sense the presence of the workpiece in stand S2 at program step 104 and then (during a later run through the program) to first sense the presence of the workpiece in stand S3 at program step 108. This decremented count level now in the time delay counter is compared at program step 118 with the initial large number stored in this counter, in accordance with a previous run through this same program at program step 112. An exclusive OR operation is used for this comparison to determine the difference between these two count levels, and this difference is the time interval $\Delta T$, stored in the memory of the digital computer system 12 at program step 120. At program step 122 the indicator flag is set again, such that for the next run through this same program after the workpiece leaves stand S3, the start indicator flag will be set, and this run through the program ends.

It should be noted that the start indicator flag is cleared when the whole of a given workpiece is passed through all the stands of the rolling mill. Also it should be noted that the illustrated program shown in FIG. 4 is operative to provide a transport time interval $\Delta T$ for the head end of the workpiece to pass from measurement stand S2 and arrive at correction stand S3. However, the same principle of operation could be applied relative to any other correction stand of the rolling mill, where it is desired to provide an anticipation correction for any gauge error condition sensed relative to the operation of a previous roll stand.

The fact that the flag indicator is not clear will be sensed at step 116, and the run of the program will then advance to END 106, because once the travel time interval $\Delta T$ is established for the head end of the workpiece strip to travel from roll stand S2 to roll stand S3, this transport time interval $\Delta T$ for the illustrated program remains the same and is stored in memory. The particular rolling mill for which the program shown in FIG. 3 is provided was operated at the same speed throughout the whole length of the workpiece. In other words, the run speed was the same as the thread speed. With the indicator flag as set at program step 122 during the previous run through this program for the same workpiece which is now present in at least the first three stands of the rolling mill, the subsequent runs through this same program every one-tenth of a second will end at program step 116 sensing that the indicator flag is not cleared and the program will advance to step 106 which is the end of the run through the program.

When a subsequent workpiece strip enters the rolling mill, the same operation as above described will take place to establish the transport time interval $\Delta$ of the head end of the workpiece strip from stand S2 as the measurement stand to stand S3 as the correction stand.

Figure 5:
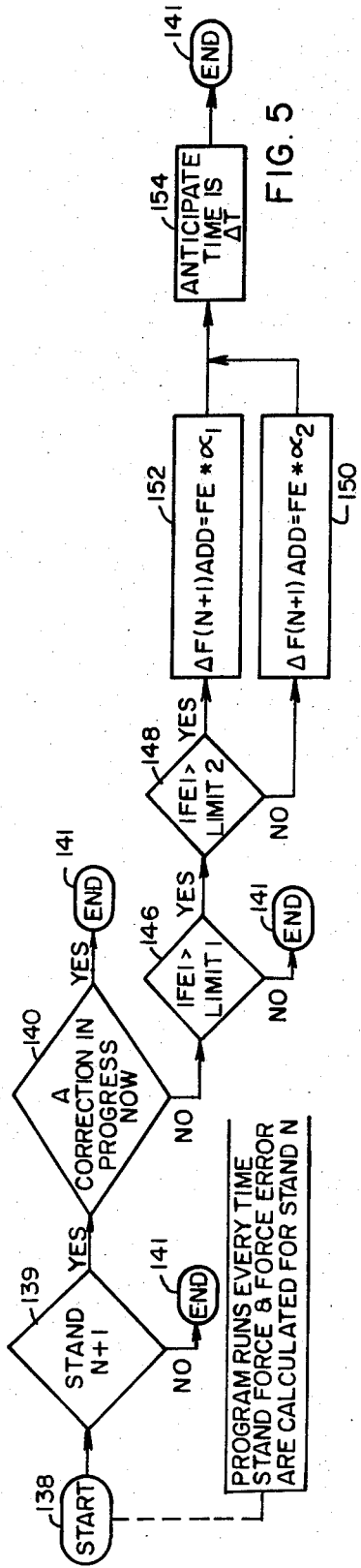
FIG. 5 shows the logic flow chart for the automatic gauge control program subroutine employed in the digital computer system shown in FIG. 1 to determine the correction of stand N+1 to correct the force error in measurement stand N.

The program flow chart shown in FIG. 5 is a subroutine for an earlier control program for a roll force gauge control system, as set forth in the copending patent application, Ser. No. 686,783 filed Nov. 29, 1967 and as will be later explained. This roll force gauge control system is operative when the workpiece strip is present in all stands such that normal rolling mill operation is taking place. The present invention was made as an improvement to that earlier roll force gauge control system.

At step 138 this program runs every time a force error FE is calculated for stand N under control. At step 139 a determination is made if stand N is stand S2, and if it is not the program advances to the end 141. If it is stand S2, the program advances to step 140.

At step 140 of the program shown in FIG. 5, there is established if a correction for the gauge error disturbance is now in process. If such a correction is presently taking place, this run through the program will end at step 141, where the sub-routine returns to the main program. On the other hand, if such a correction is not in process at the present time, the program advances to step 146 for a determination whether the roll force error FE is greater than predetermined LIMIT 1. If it is not, an operational deadband is here provided, and the run through this program ends. If the absolute value of the determined roll force error FE is greater than the deadband force error limit, LIMIT 1, the program advances to step 148 where a comparison of the absolute value of the roll force error FE is made with the second predetermined gauge error limit LIMIT 2. It should be understood that the roll force error is in pounds of roll force at measurement roll stand S2, however the force error is directly related to workpiece gauge error.

If the absolute value of the roll force error FE is found at step 148, to be less than the second predetermined limit LIMIT 2 the program advances to step 150 where the desired additional correction $\Delta F(N+1)ADD$ at stand N+1, and which is the additional force increment required to be added to the roll force error at stand N+1 determined by its own stand force error determination using the relationship $FE = F_X - F_R - K(SD_2 - SD_1)$. The additional correction $\Delta F(N+1)ADD$ equals the stand N force error times a second gain factor $\alpha 2$. On the other hand, if the absolute value of the force error FE is found at program step 148 to be greater than the second predetermined limit LIMIT 2, the program advances to step 152 where the additional correction $\Delta F(N+1)ADD$ is set equal to the stand N roll force error FE times a first gain factor α1, larger than the second gain factor α2. A typical example of the first gain factor α1 could be 0.8, and a typical example of the second gain factor α2 could be 0.6. The program then advances to step 154 where the measured time delay interval ΔT is set into a countdown time control counter for controlling the application of the additional correction ΔF(N+1)ADD to correct the roll opening of stand (N+1), and the program ends at step 141. This latter counter starts to decrement immediately since there is a synchronize interrupt program already going in the digital computer system 12, which decrements this counter by one count every one-tenth a second.

The time delay interval required for a given workpiece portion to travel from a selected measurement stand N to the succeeding correction stand N+1 is related to the respective operating speeds of the stands S1 to S7. The following chart illustrates typical values in this regard.

| Stand | Illustrative Operating Speed | Transport Time Interval Between Next Adjacent Stand |
|---|---|---|
| S1 | 330 Ft/Min | S1 to S2—3.3 Sec |
| S2 | 530 Ft/Min | S2 to S3—2.2 Sec |
| S3 | 895 Ft/Min | S3 to S4—1.2 Sec |
| S4 | 1100 Ft/Min | S4 to S5—1.0 Sec |
| S5 | 1480 Ft/Min | S5 to S6—0.73 Sec |
| S6 | 1800 Ft/Min | S6 to S7—0.6 Sec |

The program shown in FIG. 5 has been operative to put the time delay interval into the time delay counter to represent the transport time delay of the workpiece portion between stand N and stand N+1, and the desired additional screw movement correction ΔF(N+1+1 has been determined in relation to the magnitude of the stand N determined workpiece strip gauge error related force error and put into the address location for such correction.

Figure 6:
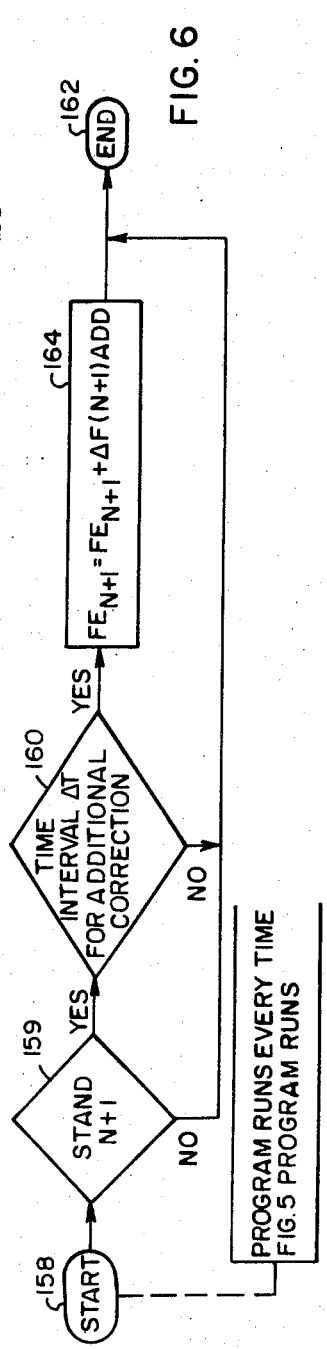
FIG. 6 shows the logic flow chart for the automatic gauge control program subroutine employed with the digital computer system shown in FIG. 1 to determine the desired roll force correction for the succeeding correction stand N+1.

The program flow chart shown in FIG. 6 establishes the corrective action to be taken relative to the gauge error correction roll stand S3, for the example chosen relative to the programs shown in FIGS. 4, 5 and 6. After the start of the program shown in FIG. 6 at step 158, there is determined at step 159 if the present stand being indexed is the selected correction stand N+1. If it is not stand N+1, the program ends. If it is the correction stand N+1, the program advances to step 160 where it is determined if this is the proper time interval ΔT to make the desired additional correction ΔF(N+1)ADD. The answer is yes when the time delay counter contains the determined time interval count. On the other hand, if there was no time count stored in the time delay counter, the answer would be no and this run through the program would go to end 162. When the answer at step 160 is yes, such that the time delay counter is now counting down, the program advances to step 164 to determine the new value for the force error at stand (N+1), which is stand S3, as being equal to the force error FE(N+1) due to gauge error at stand N+1 plus the additional correction ΔF(N+1)ADD established at one of steps 150 or 152 in the FIG. 5 program for stand S3. This establishes the amount of screw movement correction required for the correction stand S3 to correct for the work strip gauge error sensed at the previous roll stand S2 plus the work strip error sensed at the stand S3 roll force gauge control system. This run through the program shown in FIG. 6 now ends at step 162.

Figure 7:
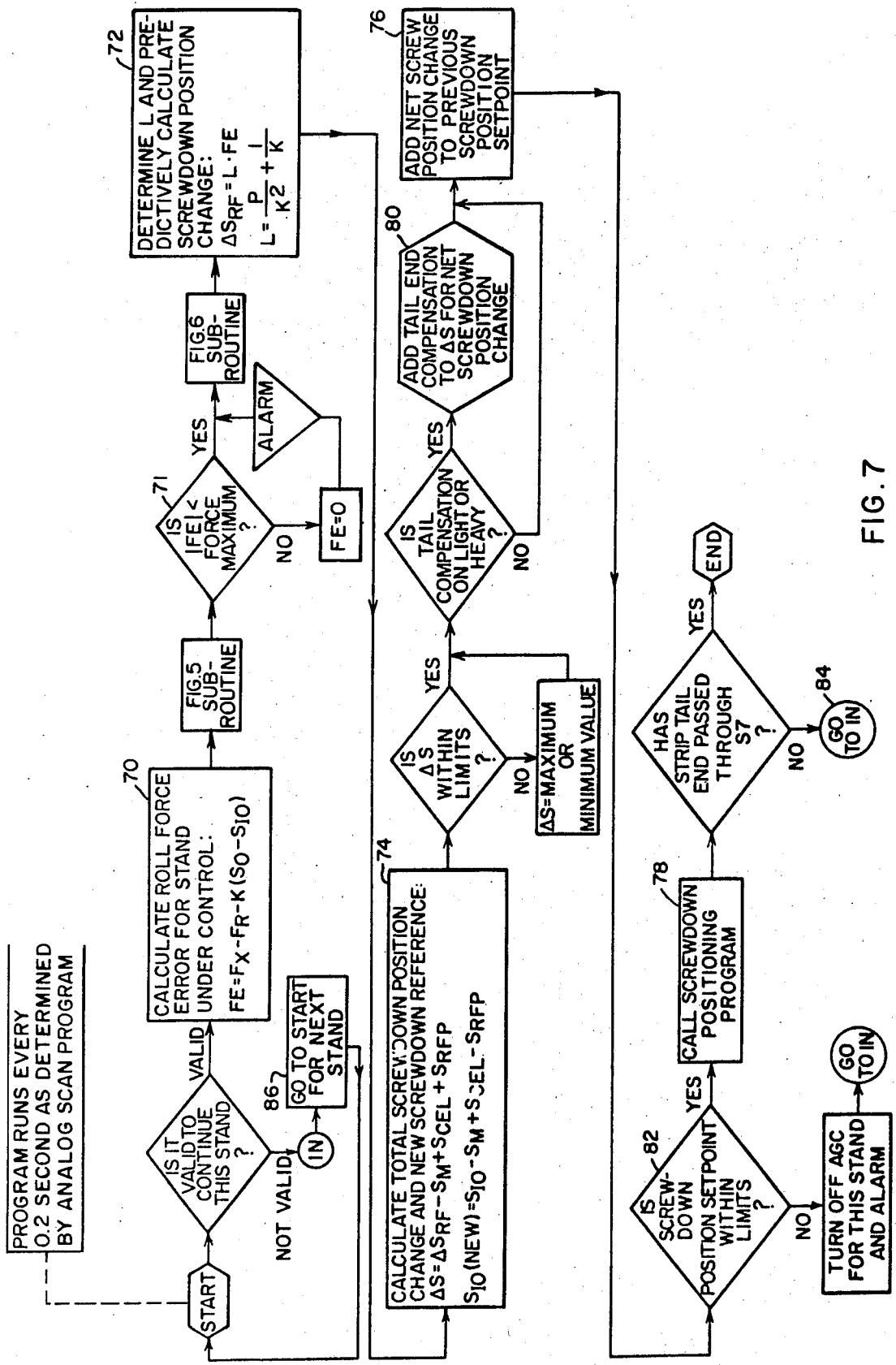
FIG. 7 shows the prior art automatic gauge control program employed for the predictive gauge control method and apparatus with adaptive plasticity determination of the above referenced U.S. Pat. No. 3,561,237, wherein the subroutine programs shown in FIGS. 5 and 6 of the present application, are subroutines inserted as indicated into the automatic gauge control program employed in the practice of the previous invention described in the latter copending patent application.

The prior art automatic gauge control program as shown in FIG. 7 will now take this determined screwdown movement correction FE(N+1) for the stand N+1 and convert it in relation to the desired work strip delivery gauge from stand S3 in accordance with above equation (3) to establish an adjusted screwdown position and then will output a screwdown correction for stand (N+1) based upon this correction FE(N+1).

In reference to copending patent application Ser. No. 686,783 filed Nov. 29, 1967, the required screwdown correction $\Delta S_{RF}$ is predictively calculated to produce the feed forward roll force gauge control operation as compared to conventional feedback roll force gauge control operation. The feed forward operation is required screwdown correction being: $\Delta S_{RF} = L * FE$ where $L = [(P/K^2) + (1/K)]$. $K$ is the mil spring constant (in units of $10^6$ pounds per inch), $P$ is the workpiece plasticity (in units of $10^6$ pounds per inch). In order to calculate the predicted amount of screwdown movement at stand N+1 required to correct a determined roll force error FE(N+1), determined by the step 164 of the program shown in FIG. 6, the equation for $\Delta S_{RF}$ can be used.

In providing for the roll force error calculations, relationship $FE = F_X - F_R - K(SO - SI_D)$ defines, for a given stand, the difference between the present roll force $F_X$ and the reference roll force $F_R$ (either lock-on or model equation predicted absolute as predetermined) and subtraction from that difference of the amount of change in roll force caused by screwdown movement made to correct previous roll force error. Thus, the roll force error FE as calculated at any point in time with the use of the above relationship properly equals the amount by which the present measured roll force differs from the roll force required for correct gauge at the present screwdown position. Corrective screwdown movement in the predicted amount produces further roll force change and FE becomes zero if the system behavior corresponds to predictions and if no new roll force error develops during the period of correction. If the system does not behave as predicted, FE does not become zero and in effect a new roll force error FE is generated to the extent that the executed screwdown movement in the predicted amount fails to correct the stand delivery gauge.

One possible limiting factor on reaching critical damping screwdown movement and 100 percent gain tuning, on a more or less continuous basis is the accuracy with which the corrective screwdown movement calculations correspond to actual screwdown movement required for correction of gauge errors. In turn the accuracy of screwdown movement prediction depends upon the accuracy of predicting the operation values of mill spring modulus K and workpiece plasticity P.

By using the relationship $[(P/K^2) + (1/K)]$ to convert a force error into a screw correction movement, this was considered as equivalent of the mils error divided by the mill spring constant to convert the gauge error into an equivalent force error.

In FIG. 7, there is shown a portion of the prior art automatic gauge control program employed in the control computer to predict corrective screwdown movement values for each indexed roll stand as described in more detail in the above referenced copending application Ser. No. 686,783 filed Nov. 29, 1967. The basic logic flow steps related to control action determination in the AGC computer program is illustrated in FIG. 7. Once a start determination and a validity determination have been made for control action at a particular stand, the roll force error FE is calculated as indicated by the step 70. The program then advances to the subroutine program shown in FIG. 5 to determine if a feed forward correction is to be determined for the succeeding stand N+1 to additionally correct the roll opening of stand N+1 for the force error determined at stand N. If the calculated roll force error is less than a predetermined maximum, the program advances to the subroutine program shown in FIG. 6 and checks to see if the control stand is N+1. When the control program shown in FIG. 7 indexes to the next stand N+1 and the force error for stand N+1 is calculated at step 70, the FIG. 6 subroutine will add to the latter force error FE (for the workpiece gauge error in stand N+1) the previous program run established $\Delta F(N+1)$ ADD in accordance with step 164 of the FIG. 6 program. This combined force error is multiplied by the quantity L as indicated by the program step 72 to determine a predicted screwdown position change required for roll force error compensation to be made at correction stand N+1, which in the provided example is stand S3. The quantity L is thus in effect a component of the overall roll force gauge control system gain, and its on-line determination lays the foundation for improved gain tuning and so forth. In predicting corrective screwdown position change, the value L is calculated from respective values of the plasticity P and the spring characteristic K which have been predetermined. Generally, the operative value of each stand spring characteristic K is relatively accurately known. It is first determined by the conventional work roll screwdown test, and it can be recalculated prior to each workpiece pass on the basis of the workpiece width and the backup roll diameter. Each resultant stand mill spring curve 84 as shown in FIG. 2, is stored for on-line gauge control use. The operative value of the workpiece plasticity P at each stand is also relatively accurately determined. In the present case, P value tables can be stored in the memory of the digital computer system 12 to identify the various values of P which apply to the various mill stands for various workpiece grade and gauge characteristics under various operating conditions and at various operating times during the rolling of each workpiece strip 14. If a predicted screwdown position change does not correct the roll force error as predicted, some small roll force error remains and in effect it is treated as a new roll force error. In practice, the analog scan rate of approximately 0.2 second would usually be faster than the rate at which screwdown movement can be made to compensate for at least some and probably most roll force errors, and the particular roll force error calculated in the step 70 at any particular point in time can thus comprise a portion of a previous roll force error still uncorrected, a new roll force error, a roll force error remaining after screwdown movement because of some inaccuracy in the predictive calculation, or some combination of these errors.

After execution of the AGC program shown in FIG. 7, for the current stand the execution of the AGC program is repeated for the next stand as indicated by the reference characters 84 and 86. In one actual application the AGC program shown in FIG. 7, execution occurred for each of the seven mil stands S1 through S7 once every 0.2 seconds. That is at the input analog signal scan rate for the respective roll force signals from the load cells 34 operative with the roll stands S1 through S7 respectively.

The present invention feeds the error force at stand N formed to the next stand N+1 and removes the resulting correction at the proper time when the portion of workpiece strip containing the sensed gauge error disturbance reaches the next correction stand N+1.

The $\Delta S$ for stand N+1 in relation to the force error determined at stand N+1 is determined at step 70 of the program shown in FIG. 7. The additional correction for stand N+1 in relation to force error determined at stand N is determined by the FIG. 5 program sub-routine, during the run through the FIG. 7 program for stand N.

When measurement stand S2 senses a force error greater in magnitude than the minimum limit of the provided dead band operation, this gauge error represented as force error is immediately applied in full to change the screw position of the next correction stand S3, in a direction to correct this sensed gauge error.

The time is counted as determined by a strip in stand logic operation, such that when a force error signal is determined for the previous measurement stand S2, the control system begins a countdown of a stored count level in the counter such that when the counter is counted down to zero, the force error signal from the previous measurement stand S2 is removed and no longer permitted to adjust the screw position of the next correction stand S3. In addition, the stored time count in the counter will be zero, when no force error is sensed at the previous measurement stand S2, and therefore no correction is required at the correction stand S3. The transport time of a given portion of the workpiece strip is known since the work strip is threaded through all of the roll stands and is then normally run through all of the roll stands at substantially the same speed. Thusly, the strip in stand logic operation for each adjacent pair of stands will establish the respective transport time interval or delay for a given portion of workpiece strip to travel between the associated adjacent pair of roll stands. It should be that the force error FE is directly related to the required screw correction since the only difference is the modification due to the multiplier $$\left(\frac{P}{K^2}+\frac{1}{K}\right).$$

Figure 8:
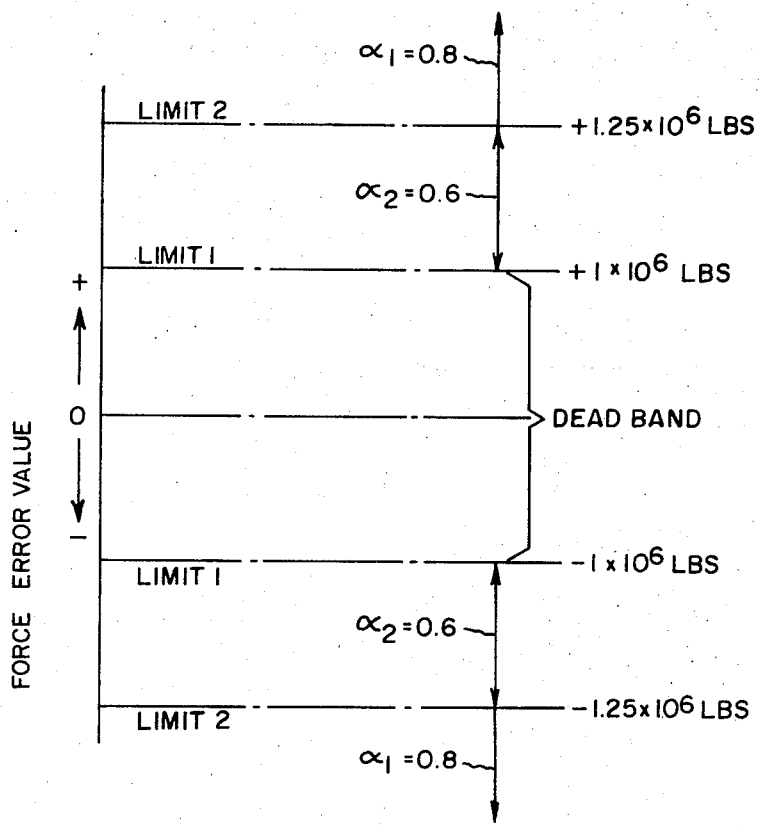
FIG. 8 illustrates the operational dead band and the gain characteristic for the force error correction of the correction stand.

In FIG. 8 there is illustrated the values of the LIMIT 1 and LIMIT 2 in relation to the determined force error at measurement stand N. A typical value for LIMIT 1 can be $\pm$ 20 mils, and a typical value for LIMIT 2 can be $\pm$ 40 mils. A typical value for the multiplier $\alpha 2$ can be 0.6, and a typical value for the multiplier $\alpha 1$ can be 0.8.

In summary, a process control system is uniquely organized to provide improved metal rolling mill gauge control performance. The control system preferably includes a digital computer system which provides predictive roll force gauge control operation of the screwdowns at each of one or more roll force gauge control stands in the mill. The gauge error correction desired for rolling conditions at a given measurement roll stand is sensed as a force error at the latter stand and then put into operation to adjust a succeeding correction roll stand for a determined time interval after which the gauge error correction is removed. The time interval during which this gauge error correction is applied to the succeeding stand is determined in accordance with the established time interval for the head end of the work strip to travel from the measurement stand to the correction roll stand. During this time delay interval, which is in accordance with the transport time for a sensed gauge error disturbance in the workstrip to travel from the measurement stand to the succeeding correction stand where the gauge error correction is applied in an appropriate manner to remove the associated gauge error by that succeeding correction stand.

I claim:

1. A gauge control system for a rolling mill having at least two rolling stands, with each of said stands having a controlled roll opening through which a workpiece is passed said system comprising:

means for detecting the roll force of a first of said rolling stands, means for detecting the roll opening of said first rolling stand, means for determining a workpiece delivery gauge error representation in a portion of said workpiece passing through said first rolling stand in relation to said detected roll force and said detected roll opening and a predetermined roll force and a predetermined roll opening for said first rolling stand, means for determining the adjustment of the roll opening of a second of said rolling stands in accordance with said error representation to control the workpiece delivery gauge from said second rolling stand, means for determining the time interval required for said workpiece portion to be transported between said first rolling stand and said second rolling stand, and means for controlling the second rolling stand roll opening in accordance with said adjustment for a time period related to said time interval.

2. A gauge control system as set forth in claim 1 wherein said means for determining the gauge error representation and said time interval includes a programmed digital computer system, said computer system having an input coupled for response to said detecting means and having an output coupled to operate said means for controlling the second rolling stand roll opening.

3. A gauge control system as set forth in claim 2, wherein said computer system includes control program means operative to make the predetermined roll force and the predetermined roll opening determinations.

4. A gauge control system as set forth in claim 1, wherein said gauge error representation determining means operates in response to the presence of said workpiece in the roll opening of each of said first and second rolling stands.

5. A gauge control system as set forth in claim 1 wherein said gauge error representation determining means is operative substantially throughout the rolling period of said workpiece.

6. A gauge control system as set forth in claim 1 wherein the rolling mill is a tandem mill having a plurality of roll force gauge controlled stands, with each of the latter stands being provided with said roll force detecting means and said roll opening detecting means, with said gauge error representation determining means being operative to determine the gauge error representation for respective selected stands of said rolling mill, and with said roll opening adjustment determining means being operative to determine the roll opening of a succeeding stand in relation to each such gauge error representation that is determined.

7. A gauge control system as set forth in claim 1, with said means for determining a workpiece delivery gauge error representation being operative to determine a force error in accordance with the relationship:

$$FE = F_X - F_R - K(SD_1 - SD_2)$$

where $FE$ is the determined gauge error representation force error, $F_X$ is the first stand detected roll force, $F_R$ is the predetermined roll force, $K$ is the mill spring characteristic, $SD_1$ is the first stand detected roll opening, and $SD_2$ is the predetermined roll opening.

8. A method for providing gauge control in a rolling mill having at least two rolling stands with respective screwdown controlled roll openings through which a workpiece is passed, the steps of said method comprising:

detecting the roll force of one of the rolling stands, detecting the screwdown position of said one rolling stand, determining the roll force error for said one rolling stand in accordance with said detected roll force and said detected screwdown position values and predetermined roll force and predetermined screwdown position values, determining a correction to be made in the screwdown position of another of the rolling stands to provide for corrected delivery gauge from said another rolling stand, determining the time interval required for the workpiece portion for which said force error is determined to pass from said one rolling stand to said another rolling stand, with said correction determining step including predictively determining said correction in the screwdown position of said another rolling stand in accordance with the magnitude of said roll force error, and controlling the screwdown position of said another rolling stand for a time period having a predetermined relationship to said time interval for effecting said correction.

9. A method for providing gauge control in a rolling mill as set forth in claim 8, wherein the roll force error determining step includes the operation of a digital computer system including a control program operative to sense the detected roll force and detected screwdown position values and to establish the predetermined roll force and predetermined screwdown position values and to calculate the roll force error for said one rolling stand.

10. A method for providing gauge control in a rolling mill as set forth in claim 9, wherein said correction determining step includes the operation of said digital computer system including said control program to predictively determine said correction in the screwdown position of said another rolling stand.

11. A method for providing gauge control in a rolling mill having at least one rolling stand with a controlled roll opening through which a workpiece is transported the steps of said method comprising:
  detecting a representation of the gauge error in a workpiece portion located at least a predetermined distance ahead of one rolling stand of said rolling mill,
  determining the time interval required for said workpiece portion to be transported said predetermined distance,
  providing a gauge error correction in accordance with the magnitude of said detected gauge error representation,
  and controlling the roll opening of said one rolling stand in accordance with said gauge error correction for a time period determined by said time interval.

12. A method for providing gauge control in a rolling mill as set forth in claim 8,
  with said step of determining the roll force error being in accordance with the relationship:

$$FE = F_X - F_R - K(SD_1 - SD_2)$$

where $FE$ is the determined roll force error, $F_X$ is the detected roll force of said one rolling stand, $F_R$ is the predetermined roll force value, $K$ is the mill spring characteristic of said one rolling stand, $SD_1$ is the detected screwdown position of said one rolling stand, and $SD_2$ is the predetermined screwdown position value.

13. A gauge control system as set forth in claim 1, wherein:
  said means for determining a workpiece delivery gauge error representation includes a digital computer having a gauge control program which is run through for at least each of said two rolling stands to determine said workpiece delivery gauge error representation for each of said two rolling stands.

14. A gauge control system as set forth in claim 13, wherein:
  said gauge control program determines an adjustment of the roll opening of said second rolling stand in accordance with the delivery gauge error representation for the second rolling stand and determines an additional adjustment of the roll opening of said second rolling stand in accordance with the delivery gauge error representation for the first rolling stand.

* * * * *